(12) United States Patent
Yui et al.

(10) Patent No.: US 10,312,577 B2
(45) Date of Patent: Jun. 4, 2019

(54) ANTENNA ATTACHMENT STRUCTURE AND DUMP TRUCK

(71) Applicant: Komatsu Ltd., Minato-ku, Tokyo (JP)

(72) Inventors: Daichi Yui, Hitachinaka (JP); Shunsuke Mori, Hitachinaka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/751,210

(22) PCT Filed: Mar. 16, 2016

(86) PCT No.: PCT/JP2016/058413
§ 371 (c)(1),
(2) Date: Feb. 8, 2018

(87) PCT Pub. No.: WO2017/158779
PCT Pub. Date: Sep. 21, 2017

(65) Prior Publication Data
US 2018/0233813 A1  Aug. 16, 2018

(51) Int. Cl.
*H01Q 1/32* (2006.01)
*B60R 11/02* (2006.01)
(Continued)

(52) U.S. Cl.
CPC ............ *H01Q 1/3283* (2013.01); *B60P 1/04* (2013.01); *B60R 11/02* (2013.01); *F16M 13/02* (2013.01); *H01Q 1/18* (2013.01); *H01Q 1/3233* (2013.01); *H01Q 1/3275* (2013.01); *B60R 2011/004* (2013.01); *B60R 2011/008* (2013.01)

(58) Field of Classification Search
None
See application file for complete search history.

(56) References Cited

U.S. PATENT DOCUMENTS 5,410,325 A * 4/1995 Friedrich ............... H01Q 1/005
343/711
2017/0169626 A1* 6/2017 Thomsen ............... G07C 5/008

FOREIGN PATENT DOCUMENTS

JP   S61-121006   7/1986
JP   S63-308612   12/1988
(Continued)

OTHER PUBLICATIONS

International Search Report in International Application No. PCT/JP2016/058413, dated May 31, 2016, 7 pages (with partial English translation).
(Continued)

*Primary Examiner* — Trinh V Dinh
(74) *Attorney, Agent, or Firm* — Fish & Richardson P.C.

(57) ABSTRACT

An antenna attachment structure attaches a plurality of antennas to a dump truck including a chassis and a dump body rotatably provided on the chassis, the dump body covering the chassis across an entire length and entire width thereof in a plan view. The antenna attachment structure includes: an antenna attachment portion to which the plurality of antennas are attached and rotatably attached to each of lateral surfaces of the dump body; and a parallel link mechanism including the antenna attachment portion and a rotation center of the dump body and configured to keep a constant posture of the antenna attachment portion when the dump body is rotated.

6 Claims, 4 Drawing Sheets

(51) Int. Cl.
*H01Q 1/18* (2006.01)
*B60P 1/04* (2006.01)
*F16M 13/02* (2006.01)
*B60R 11/00* (2006.01)

(56) References Cited

FOREIGN PATENT DOCUMENTS

| JP | 2004-098843 | 4/2004 |
| JP | 2005-328208 | 11/2005 |

OTHER PUBLICATIONS

International Preliminary Report on Patentability in International Application No. PCT/JP2016/0584163, dated Sep. 18, 2018, 4 pages, with English translation.

* cited by examiner

ANTENNA ATTACHMENT STRUCTURE AND DUMP TRUCK

CROSS-REFERENCE TO RELATED APPLICATIONS

This application claims priority to International Application No. PCT/JP2016/058413 filed on Mar. 16, 2016, the contents of which are incorporated herein in their entirety.

TECHNICAL FIELD

The present invention relates to an antenna attachment structure and a dump truck.

BACKGROUND ART

A dump truck installed with the Global Positioning System (GPS) has been typically known (see, for instance, Patent Literature 1).

Patent Literature 1 discloses a technology that a GPS antenna is swingably provided to a front end in a travel direction of a dump body on which earth and sand and the like are loaded, and when the dump body is raised for dumping the earth and sand, the GPS antenna is swung to be constantly kept in a vertical direction to prevent a decrease in a reception accuracy of the GPS antenna.

There has been known a dump truck that serves as an unattended delivery car operable by a remote control and in which a dump body covers a chassis across an entire length and entire width thereof in a plan view (see, for instance, Patent Literature 2).

In application of Patent Literature 1 to the technology disclosed in Patent Literature 2, it is conceived that the GPS antenna is attached to a front end of the dump body.

CITATION LIST

Patent Literature(s)

Patent Literature 1: JP2005-328208A
Patent Literature 2: JP2004-98843A

SUMMARY OF THE INVENTION

Problem(s) to be Solved by the Invention

Although the unattended delivery car operable by the remote control needs to include both of an antenna for receiving radio waves used for the remote control and a GPS antenna, the aforementioned technology disclosed in Patent Literature has a difficulty in simultaneously satisfying a reception accuracy of the radio waves used for the remote control and a reception accuracy of the GPS antenna.

An object of the invention is to provide an antenna attachment structure that requires a plurality of antennas to be attached and can provide a sufficient reception accuracy of each of the antennas, and a dump truck.

Means for Solving the Problem(s)

According to an aspect of the invention, an antenna attachment structure attaches a plurality of antennas to a dump truck including a chassis and a dump body rotatably provided on the chassis, the dump body covering the chassis across an entire length and entire width thereof in a plan view. The antenna attachment structure includes: an antenna attachment portion to which the plurality of antennas are attached and the antenna attachment portion being rotatably attached to a lateral surface of the dump body; and a parallel link mechanism including the antenna attachment portion and a rotation center of the dump body and configured to keep a constant posture of the antenna attachment portion when the dump body is rotated.

According to the above aspect of the invention, since the provided parallel link mechanism can be rotated in conjunction with the rotation of the dump body to keep a constant posture of the antenna attachment portion, the plurality of antennas provided to the antenna attachment portion can exhibit a sufficient reception accuracy.

In the above arrangement, the antenna attachment portion is preferably attached to a lateral surface of a side of the dump body from which loads are dumped.

In the above arrangement, it is preferably that the parallel link mechanism includes a link rod having a first end rotatably attached to the antenna attachment portion and a second end rotatably attached to the chassis at a position offset from the rotation center of the dump body in an opposite direction from an end of the side of the dump body from which the loads are dumped.

According to another aspect of the invention, a dump truck includes the antenna attachment structure according to the above aspect of the invention.

In the above arrangement, the antenna attachment structure is preferably attached to each of lateral surfaces of the dump body.

In the above arrangement, it is preferable that the antenna attachment portion includes: an attachment body to which the plurality of antennas are attached; and an extension extending downward from the attachment body, and the plurality of antennas are positioned apart from the end of the side of the dump body from which the loads are dumped and project beyond an upper end of the dump body.

BRIEF DESCRIPTION OF DRAWING(S)

DESCRIPTION OF EMBODIMENT(S)

Exemplary embodiment(s) of the invention will be described below with reference to the attached drawings.

[1] Description of Overall Structure of Dump Truck 1

Figure 1:
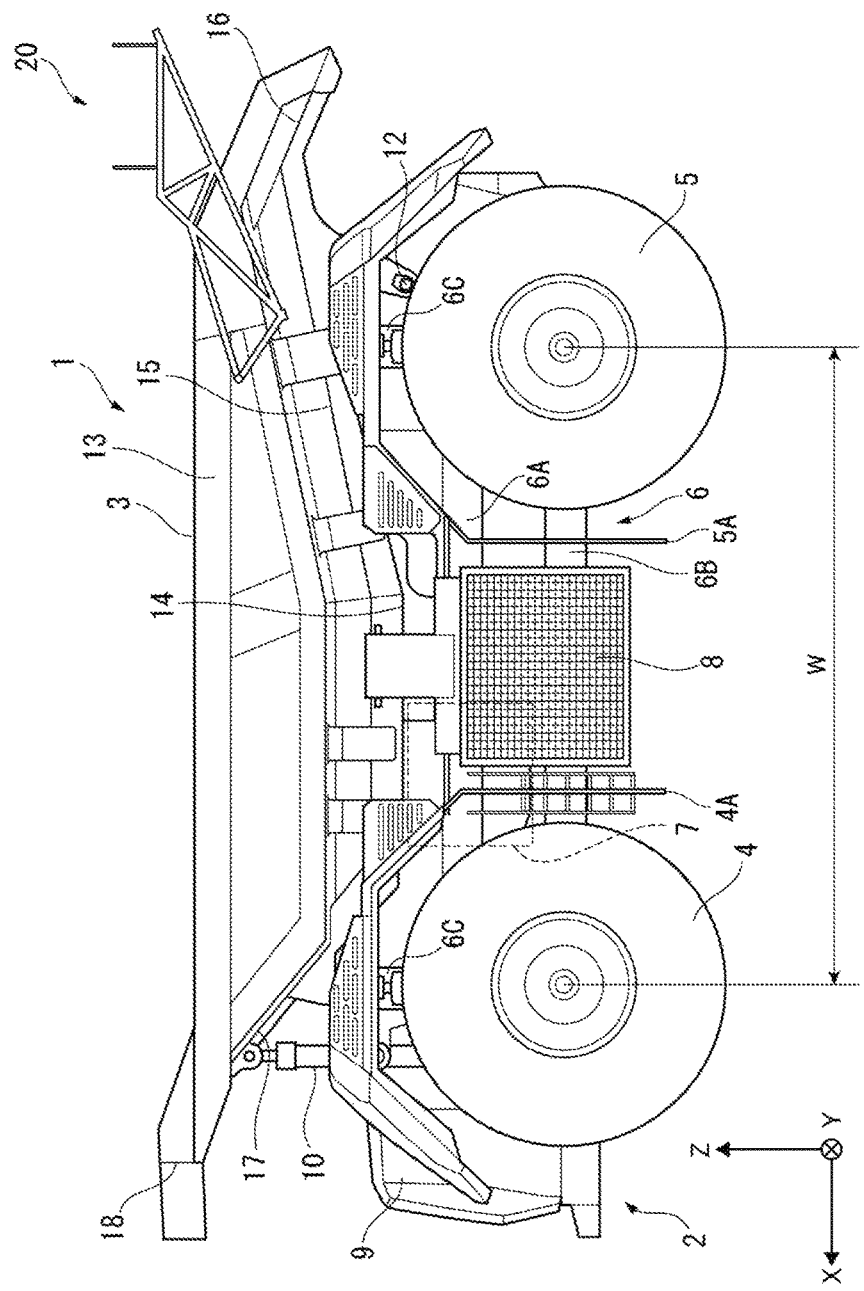
FIG. 1 is a lateral view showing a dump truck according to an exemplary embodiment of the invention.
Figure 2:
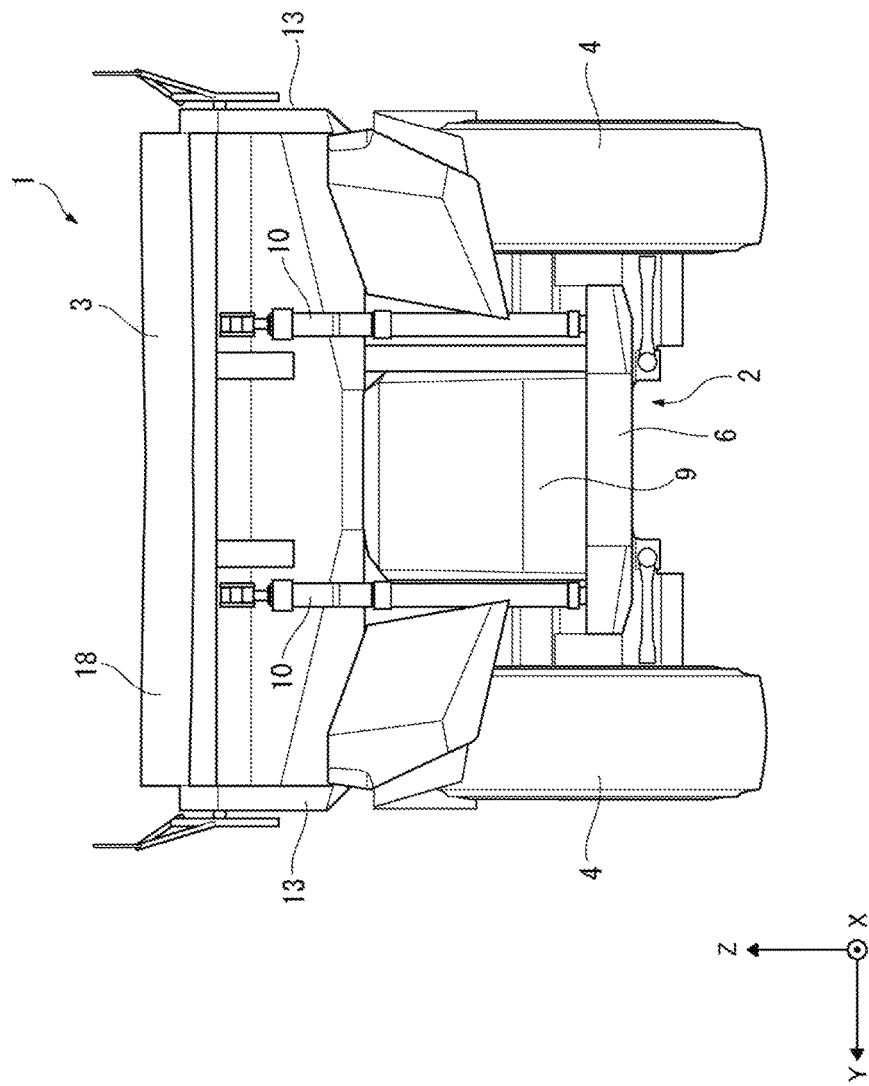
FIG. 2 is a front elevational view showing the dump truck in the exemplary embodiment.
Figure 3:
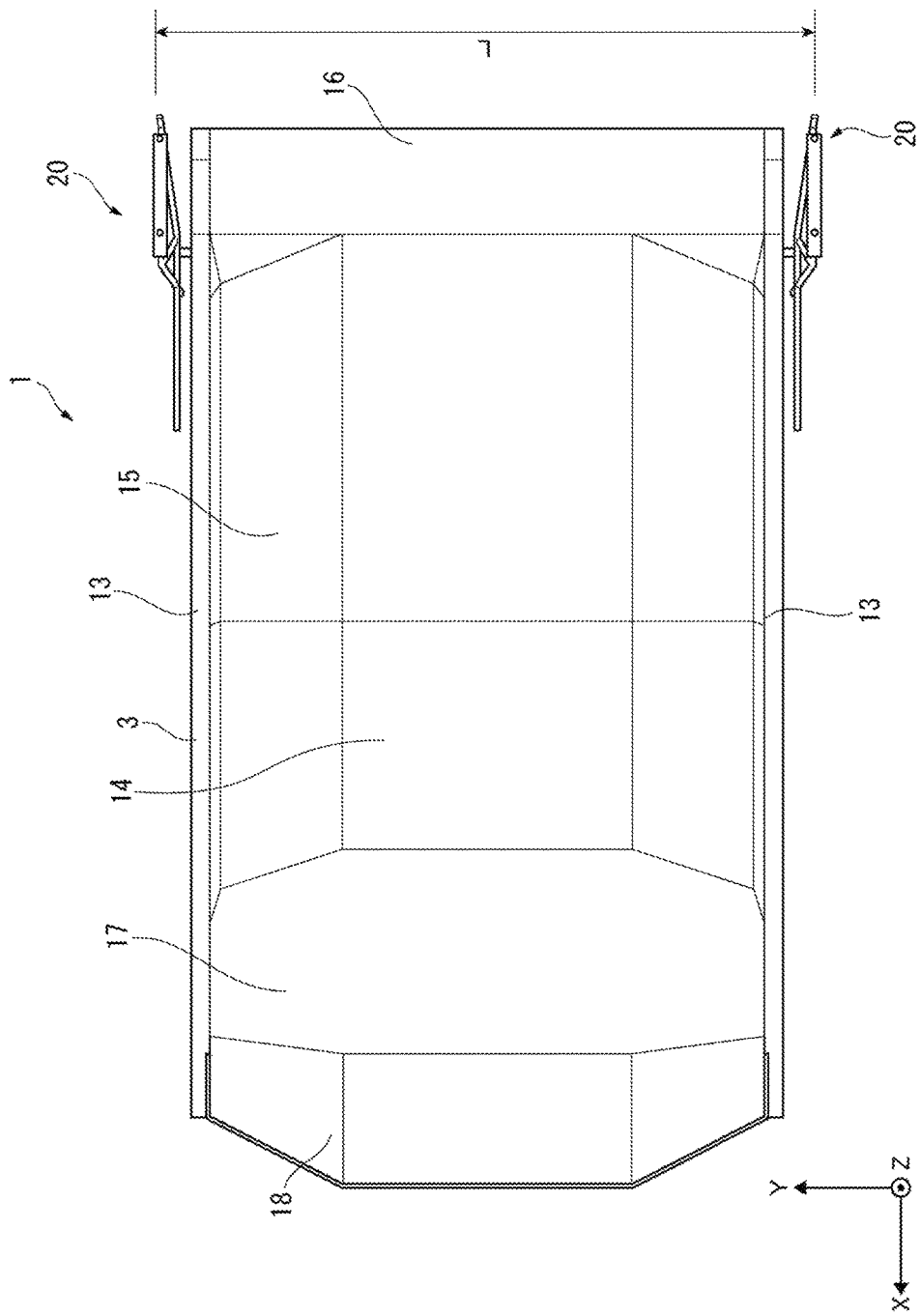
FIG. 3 is a plan view showing the dump truck in the exemplary embodiment.

FIGS. 1 to 3 show a dump truck 1 according to an exemplary embodiment of the invention. FIG. 1 is a lateral view showing the dump truck 1 as viewed in a vehicle width direction orthogonal to a travel direction. FIG. 2 is a lateral view showing the dump truck 1 as viewed in the travel direction. FIG. 3 is a plan view showing the dump truck 1 as viewed from above.

It should be noted that X axis, Y axis and Z axis in the exemplary embodiment shown in each figure are orthogonal to one another. Further, for convenience of describing the exemplary embodiment, FIG. 1 is defined as a reference, in which one of travel directions of the dump truck 1 is defined in an arrow direction of the X axis and the other of the travel directions is defined as an opposite direction, one of vehicle width directions is defined in an arrow direction of the Y axis and the other of the vehicle width directions is defined as an opposite direction, and one of vertical directions is defined in an arrow direction of the Z axis and the other of the vertical directions is defined an opposite direction. In the exemplary embodiment, a chassis 2 and a dump body 3 are each formed in a rectangular shape having forwarding sides, right side and left side. Accordingly, occasionally for convenience, the first travel direction is sometimes referred to as "front"; the second travel direction is sometimes referred to as "back"; the first vehicle width direction is sometimes referred to as "right"; and the second vehicle width direction is sometimes referred to as "left" in the exemplary embodiment below.

The dump truck 1, which is an unattended off-road dump truck configured to travel by a remote control, is an example of vehicles working at digging sites for developing mines. The remote control is conducted through a control center with full use of information communication technology such as communication units and the Global Positioning System (GPS) provided to the dump truck 1 as described in detail below.

The dump truck 1 includes the chassis 2 and the dump body 3, and is configured to travel forward in both front and back directions with loads (e.g., earth and sand) being put in the dump body 3 and dump the loads in a minus X axis direction (i.e., the second travel direction in FIG. 1). It should be noted that "to travel forward" means the same movement of the dump truck forwarding in both the front and back directions since the front side and the back side of the dump truck are not differentiated from each other.

The chassis 2 is supported in a manner to be able to travel with a pair of right and left tires 4 provided at a first side in the first travel direction and on both sides in the vehicle width direction and a pair of tires 5 provided at a second side in the travel direction and on both sides in the vehicle width direction. The chassis 2 includes a frame 6 elongated in the travel direction. The tires 4, 5 each are attached to the frame 6 via a suspension.

The frame 6 includes a pair of upper side members 6A respectively extending in the travel direction along both lateral ends of the chassis 2 and a pair of lower side members 6B respectively extending in the travel direction along both lateral ends of the chassis 2. The upper side members 6A are vertically separated from the lower side members 6B. Front and back ends of the upper side members 6A are connected to corresponding front and back ends of the lower side members 6B by a plurality of vertical members 6C. The pair of upper side members 6A provided in the vehicle width direction are connected to each other by a plurality of upper cross members extending in the vehicle width direction. The pair of lower side members 6B are connected to each other by a plurality of lower cross members extending in the vehicle width direction. In other words, the frame 6 forms a rectangular parallelepiped framework as viewed in the travel direction of the chassis 2.

An engine 7, at least one radiator 8, a controller 9, an obstacle detection sensor (not shown), and at least one hoist cylinder 10 are mounted on the frame 6. It should be noted that the dump truck 1, which is a dedicated vehicle for remote control, does not include such a cab for a driving operation as is provided in a typical dump truck.

The engine 7 is interposed between the upper side members 6A and the lower side members 6B of the frame 6. An upper portion of the engine 7 projects beyond the upper side members 6A.

Moreover, the engine 7 is provided at a back side of the tires 4 and disposed within a wheelbase W defined by rotation centers of the tires 4 and the tires 5, whereby the centroid of the dump truck 1 is substantially at the center of the chassis 2.

The at least one radiator 8 includes a pair of radiators provided substantially at the center and on both sides of the chassis 2 in the vehicle width direction and configured to cool a cooling water of the engine 7.

The controller 9 controls the travelling of the dump truck 1 based on sensor information of the obstacle detection sensor provided at an end of the chassis 2 near an end of a side of the dump body 3 from which the loads are dumped (hereinafter, also referred to as a dump end), a temperature sensor provided to the engine 7, rotation sensors provided to the tires 4, 5, and the like.

The at least one hoist cylinder 10 includes two hoist cylinders provided at a back side of the controller 9 and disposed in the vehicle width direction. Proximal ends of the two hoist cylinders are rotatably provided to the frame 6 while distal ends of the two hoist cylinders are rotatably provided to a lower surface of an opposite end of the dump body 3 from the dump end.

The hoist cylinders 10 are actuated by receiving a hydraulic oil from a hydraulic pump (not shown) provided within the frame 6. The hydraulic pump is driven by the engine 7.

[2] Structure of Dump Body 3

As shown in FIG. 3, the dump body 3 covers the chassis 2 across an entire length thereof in the travel direction and an entire width thereof in the vehicle width direction in a plan view. The dump end of the dump body 3 extends beyond an end of the chassis 2. As shown in FIG. 3, the dump body 3 is shaped in a rectangular box in the plan view. It should be noted that the front direction is not differentiated from the back direction in the dump truck since the dump body 3 and the chassis 2 are rectangular in the front and back directions in the same manner. Accordingly, the dump truck can travel forward in both the front and back directions (for convenience, the front (side) and the back (side) are used for describing the dump truck). The dump body 3 is mounted on a body mount (not shown) provided to upper ends of the respective vertical members 6C.

The dump body 3 is attached in a manner to be able to be raised and lowered (in a rotatable manner) via a hinge 12 to an end in the travel direction of the frame 6 near the dump end. Extension and contraction of the above-described hoist cylinder 10 raise and lower the dump body 3 with the hinge 12 of the frame 6 serving as a rotation shaft.

As shown in FIG. 3, the dump body 3 is shaped in a rectangular box in the plan view and includes a pair of side plates 13, a bottom portion 14, a first inclined portion 15, a second inclined portion 16, and a front portion 17. The first inclined portion 15 rises upward from a back side of the bottom portion 14. The second inclined portion 16 is inclined downward from an upper end of the first inclined portion 15. The front portion 17 rises upward from a front side of the bottom portion 14. A projection 18 is provided at an upper end of the front portion 17. An antenna unit 20 is rotatably provided on an external lateral surface (i.e., a lateral surface of a side of the dump body 3 from which loads are dumped) of a back end of each of the pair of the side plates 13.

[3] Structure of Antenna Unit 20

Figure 4A:
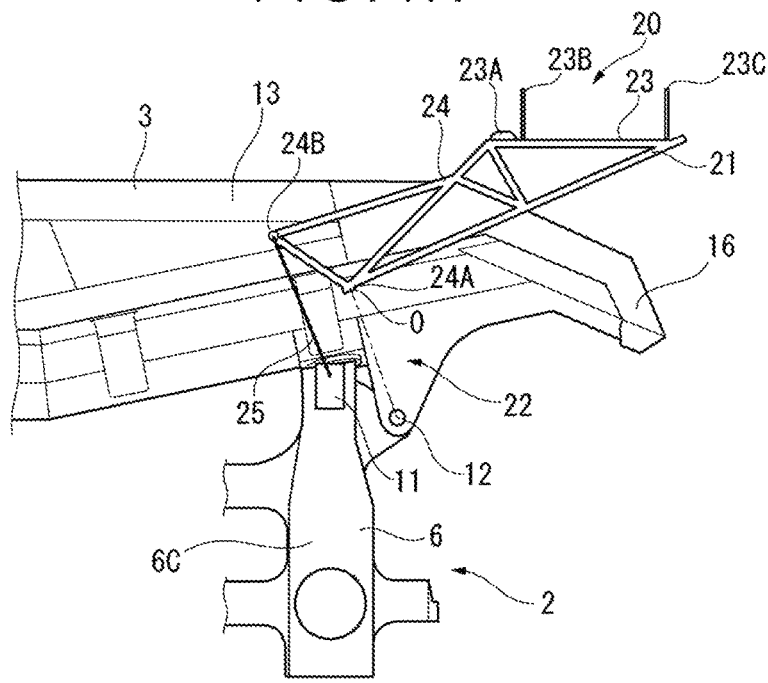
FIG. 4A is a lateral view showing an antenna attachment structure in the exemplary embodiment.
Figure 4B:
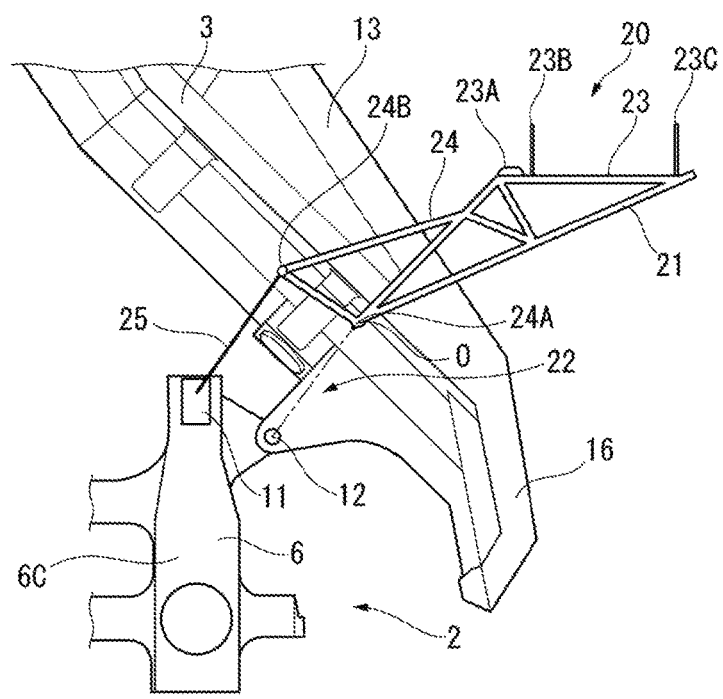
FIG. 4B is another lateral view showing the antenna attachment structure in the exemplary embodiment.

The antenna unit 20 in a form of an antenna attachment structure according to the exemplary embodiment includes an antenna attachment portion 21 and a parallel link mechanism 22 as shown in FIG. 4A. The antenna attachment portion 21 is attached to each of the side plates 13 of the dump body 3 such that the antenna attachment portion 21 is rotatable around a rotation center O on each of the side plates 13. The antenna attachment portion 21 includes an attachment body 23 and an extension 24.

The parallel link mechanism 22 is formed by the extension 24 of the antenna attachment portion 21, the hinge 12 that defines the rotation center of the dump body 3, the rotation center O at which the antenna attachment portion 21 is rotatably attached, and a link rod 25 disposed in parallel to a line connecting the hinge 12 to the rotation center O on each of the side plates 13.

The attachment body 23 is in a form of a horizontally extending steel plate. The attachment body 23 includes a plurality of antennas 23A to 23C.

The antenna 23A, which is a GPS antenna, is configured to receive electric waves from a communication satellite and identify a position of the dump truck 1 per se.

The antenna 23B is configured to acquire positional information for control with use of GPS and output error information, operating information, positional information and the like of the dump truck 1 through the satellite communication. Since the positional information for control with use of the GPS needs to be acquired more frequently and accurately than the positional information obtained by the antenna 23A, the antenna 23B acquires the positional information at the higher accuracy than the antenna 23A. For this reason, the antenna 23B needs to be kept at a constant posture in order to stabilize sensitivity.

The antenna 23C, which is an antenna usable for wireless LAN communication, is configured to receive an operational signal sent by an operator for remote control from the outside and output the operational signal to the controller 9. The controller 9 is configured to receive the operational signal sent from the operator and control travelling of the dump truck 1.

As shown in FIG. 3, a first set of the antennas 23A to 23C and a second set of the antennas 23A to 23C are respectively provided to lateral surfaces of the dump body 3 in the vehicle width direction such that the first set of the antennas 23A to 23C is apart from the second set of the antennas 23A to 23C by a dimension L slightly longer than the vehicle width of the dump truck 1. Since the first set of the antennas 23A to 23C are positioned apart from the second set of the antennas 23A to 23C in the vehicle width direction, a currently facing direction of the dump truck 1 as well as a position of the dump truck 1 can be detected based on the positional information detected by the first and second sets of the antennas 23A to 23C.

As shown in FIG. 4A, the first and second sets of the antennas 23A to 23C are disposed to the corresponding attachment body 23 such that an upper end of each of the antennas 23A to 23C projects beyond an upper end of the dump body 3 and the antennas 23A to 23C are positioned apart from a part, where loads are loaded, of each of the side plates 13 of the dump body 3. Accordingly, the steel side plates 13 do not hamper transmission and reception of various radio waves.

The extension 24 is in a form of a truss member that is a combined steel pipes extending forward in the travel direction of the dump truck 1 from a lower surface of the attachment body 23. A lower end 24A of the extension 24 is rotatably attached to the rotation center O on each of the side plates 13.

The link rod 25 is offset against the dump end of the dump body 3 in an opposite direction from the dump end. The link rod 25 is in a form of a steel stick. A first end of the link rod 25 is rotatably attached to a front end 24B offset against the lower end 24A of the extension 24 by a predetermined dimension while a second end of the link rod 25 is rotatably attached to a base 11 provided on an outer surface of the vertical member 6C.

When the dump body 3 is raised for dumping, the link rod 25 pulls the front end 24B of the extension 24 downward, so that the posture of the attachment body 23 is kept horizontal to allow each of the antennas 23A to 23C to be constantly kept in a vertically upright posture.

[4] Advantage(s) of Embodiment(s)

The above exemplary embodiment provides advantages as follows.

Since the antenna unit 20 is attached to each of the side plates 13 via the parallel link mechanism 22, the posture and height of the antenna attachment portion 21 can be kept constant even when the dump body 3 is rotated, so that a sufficient reception accuracy of each of the plurality of antennas 23A to 23C provided to the antenna unit 20 can be obtained.

Moreover, since the antenna unit 20 is disposed near the dump end of the dump body 3, the height of each of the antennas 23A to 23C is almost unchanged even when the dump body 3 is raised for dumping.

Since the antenna unit 20 is attached to each of the lateral surfaces of the dump body 3 near the dump end, a radius of a rotation of the parallel link mechanism 22 in conjunction with the rotation of the dump body 3 can be decreased, so that a size of the parallel link mechanism 22 can be decreased.

Since the parallel link mechanism 22 can be formed by only connecting the attachment body 23 and the extension 24 to the chassis 2 using the link rod 25, the attachment structure of the antenna attachment portion 21 can be simplified.

Since the antenna attachment portion 21 includes the extension 24, the plurality of antennas 23A to 23C can be positioned apart from the dump end of the dump body 3 and can project beyond the upper end of the dump body 3. Accordingly, when the loads loaded on the dump body 3 are dumped, the plurality of antennas 23A to 23C can be prevented from colliding against the loads to be broken. Moreover, since the plurality of antennas 23A to 23C project beyond the upper end of the dump body 3, the plurality of antennas 23A to 23C can be prevented from being affected by the dump body 3 to lower the reception accuracy.

[5] Modification(s) of Embodiment(s)

It should be understood that the scope of the invention is not limited to the above-described exemplary embodiment(s) but includes modifications and improvements without departing from the scope of the invention.

For instance, although three types of the antennas 23A to 23C are provided in the antenna attachment portion 21 in the above exemplary embodiment, the number of the type of the antennas is not limited to three types. Two types of the antennas or four or more types of the antennas may be disposed.

Although the link rod 25 is rotatably provided between the front end 24B of the extension 24 and the end of the chassis 2 near the dump end of the dump body 3 in the above exemplary embodiment, the position of the link rod 25 is not limited thereto. The link rod 25 may be attached at any position on the chassis 2 and the dump body 3 as long as the parallel link is formable between the chassis 2 and the dump body 3.

Although the extension 24 is in a form of the truss member in the above exemplary embodiment, the extension 24 may be in a form of a plate member.

Further, the specific arrangements and configurations for implementing the invention may be altered in any manner without departing from the scope of the invention.

The invention claimed is:

1. An antenna attachment structure attaching a plurality of antennas to a dump truck comprising a chassis and a dump body rotatably provided on the chassis, the dump body covering the chassis across an entire length and entire width thereof in a plan view,
   the antenna attachment structure comprising:
   an antenna attachment portion to which the plurality of antennas are attached and the antenna attachment portion being rotatably attached to a lateral surface of the dump body; and
   a parallel link mechanism comprising the antenna attachment portion and a rotation center of the dump body and configured to keep a constant posture of the antenna attachment portion when the dump body is rotated.

2. The antenna attachment structure according to claim 1, wherein
   the antenna attachment portion is attached to a lateral surface of a side of the dump body from which loads are dumped.

3. The antenna attachment structure according to claim 1, wherein
   the parallel link mechanism comprises a link rod comprising: a first end rotatably attached to the antenna attachment portion; and a second end rotatably attached to the chassis at a position offset from the rotation center of the dump body in an opposite direction from an end of a side of the dump body from which loads are dumped.

4. A dump truck comprising the antenna attachment structure according to claim 1.

5. The dump truck according to claim 4, wherein
   the antenna attachment structure is attached to each of lateral surfaces of the dump body.

6. The dump truck according to claim 4, wherein
   the antenna attachment portion comprises: an attachment body to which the plurality of antennas are attached; and an extension extending downward from the attachment body, and
   the plurality of antennas are positioned apart from an end of a side of the dump body from which loads are dumped and project beyond an upper end of the dump body.

* * * * *